US012573617B2

(12) United States Patent
Huang et al.

(10) Patent No.: US 12,573,617 B2

(45) Date of Patent: Mar. 10, 2026

(54) ANODE MATERIAL FOR LITHIUM-ION SECONDARY BATTERY, AND ANODE, BATTERY AND MANUFACTURE METHOD THEREOF

(71) Applicant: CPC CORPORATION, TAIWAN, Kaohsiung (TW)

(72) Inventors: Jen-Hsien Huang, Kaohsiung (TW); Meng-Jer Tsai, Kaohsiung (TW); Chih-Chieh Wang, Kaohsiung (TW)

(73) Assignee: CPC CORPORATION, TAIWAN, Kaohsiung City (TW)

( * ) Notice: Subject to any disclaimer, the term of this patent is extended or adjusted under 35 U.S.C. 154(b) by 523 days.

(21) Appl. No.: 18/112,878

(22) Filed: Feb. 22, 2023

(65) Prior Publication Data

US 2024/0162418 A1 May 16, 2024

(30) Foreign Application Priority Data

Nov. 3, 2022 (TW) .................................. 111142043

(51) Int. Cl.

| | |
|---|---|
| ***H01M 10/0525*** | (2010.01) |
| ***H01M 4/04*** | (2006.01) |
| ***H01M 4/36*** | (2006.01) |
| ***H01M 4/58*** | (2010.01) |
| ***H01M 4/583*** | (2010.01) |
| ***H01M 4/62*** | (2006.01) |
| ***H01M 4/66*** | (2006.01) |
| ***H01M 10/04*** | (2006.01) |
| *H01M 4/02* | (2006.01) |

(52) U.S. Cl.

CPC ......... *H01M 4/366* (2013.01); *H01M 4/0404* (2013.01); *H01M 4/0471* (2013.01); *H01M 4/5825* (2013.01); *H01M 4/5835* (2013.01); *H01M 4/625* (2013.01); *H01M 4/661* (2013.01); *H01M 10/0427* (2013.01); *H01M 10/0525* (2013.01); *H01M 2004/027* (2013.01); *H01M 2004/028* (2013.01)

(58) Field of Classification Search

None

See application file for complete search history.

(56) References Cited

U.S. PATENT DOCUMENTS

2008/0020279 A1* 1/2008 Schmidt ................ H01M 4/485 429/231.95

OTHER PUBLICATIONS

I. A. Stenina, T. L. Kulova, A. M. Skundin, A. B. Yaroslavtsev. Effects of carbon coating from sucrose and PVDF on electrochemical performance of Li4Ti5O12/C composites in different potential ranges, Journal of Solid State Electrochemistry (2018) 22:2631-2639.*

* cited by examiner

*Primary Examiner* — Carlos Barcena

(74) *Attorney, Agent, or Firm* — Maschoff Brennan

(57) ABSTRACT

Disclosed is an anode material for a lithium-ion secondary battery, comprising: lithium titanate and a modified layer coating on the surface of the lithium titanate, wherein the modified layer is a fluorocarbon. The anode material forms a surface modification containing C—F bond on the surface of lithium oxide and can be used for the lithium electronic secondary battery, and the lithium electronic secondary battery comprises the anode material can avoid the formation of solid electrolyte layer on the surface of the electrode and obtain good conductivity and avoid gas production.

1 Claim, 5 Drawing Sheets

ANODE MATERIAL FOR LITHIUM-ION SECONDARY BATTERY, AND ANODE, BATTERY AND MANUFACTURE METHOD THEREOF

The present invention relates to an anode material for a lithium ion secondary battery and manufacture method thereof, and more particularly relates to an anode material for a lithium ion secondary battery with a fluorocarbon modified layer coated on the lithium titanate.

BACKGROUND OF THE INVENTION

With the development of portable electronic devices, wireless communications and electric transportation vehicles, the use of lithium ion secondary batteries, commonly known as rechargeable batteries, is increasing day by day, and the requirements for their stability are also gradually increasing.

The most commonly used material for the anode of lithium ion batteries is graphite. However, due to its low operating voltage, the battery is prone to precipitate lithium dendrite on the surface of graphite during overcharging and fast charging, and the lithium dendrite may pierce the isolation film between cathode and anode, causing safety concerns such as thermal runaway, combustion or even explosion.

In response to this problem, lithium titanate can be used as the anode material for lithium ion batteries. As the anode material for lithium ion batteries, lithium titanate has the following characteristics: (1) the structural impact caused by the embedding and disembedding of lithium ions during charging and discharging of lithium titanate batteries is very low, and is accompanied by good cyclic stability; and (2) the working voltage of lithium titanate battery is about 1.55V, which is higher than the working voltage of conventional graphite cathode, and is highly safe because it less likely to form solid electrolyte interface (SEI) and lithium dendrite during charging and discharging.

However, there are limitations in the use of lithium titanate batteries. Since the valence of lithium titanate is +4, the electrical conductivity of lithium titanate is reduced and the performance at high magnification is not satisfactory. In addition, since lithium titanate does not tend to form a solid electrolyte layer during the discharge process, it is relatively common for lithium titanate to come into direct contact with the electrolyte in electrochemical reactions, resulting in side reactions that may lead to gas production.

SUMMARY OF THE INVENTION

Therefore, one objective of the present invention is to solve the problems of conductivity and gas production of lithium titanate by surface treatment of lithium titanate.

In order to overcome the technical problems in prior art, the present invention provides an anode material for a lithium ion secondary battery, comprising a lithium titanate material; and a modified layer coated on the lithium titanate material, wherein the modified layer is a fluorocarbon.

In one embodiment, the present invention provides an anode for lithium ion secondary battery containing the anode material described above.

According to one embodiment of the present invention, the anode for the lithium ion secondary battery is provided, wherein the anode of the lithium ion secondary battery is formed by coating an aluminum foil with a mixture of the anode material for the lithium ion secondary battery, a conductive carbon and an adhesive agent.

According to one embodiment of the present invention, the anode comprises 90% by weight of the anode material of the lithium ion secondary battery, 5% by weight of the conductive carbon, and 5% by weight of the adhesive agent.

In one embodiment, the present invention provides a lithium ion secondary battery comprising the anode described above.

According to one embodiment of the present invention, the lithium ion secondary battery is a lithium-ion button battery.

According to one embodiment of the present invention, the lithium ion secondary battery is provided, wherein the cathode material of the lithium ion secondary battery is lithium cobaltate, lithium nickelate, lithium manganate, ternary cathode materials, lithium iron phosphate, lithium iron manganese phosphate and composite cathode materials composed of ternary cathode materials and lithium iron manganese phosphate.

In one embodiment, the present invention provides a manufacturing method of the anode material described above, comprising mixing lithium titanate powder and polyvinylidene fluoride powder to obtain mixed powder; and sintering the mixed powder to obtain, as the anode material, a lithium titanate material on which a modified layer of fluorocarbon is coated.

According to one embodiment of the present invention, the manufacturing method is provided, wherein the mixed powder is obtained by mixing 99% by weight of the lithium titanate powder, and 1% by weight of the polyvinylidene fluoride powder.

According to one embodiment of the present invention, the manufacturing method is provided, wherein the mixed powder is sintered at 300° C. for 2 hours under air to obtain the anode material.

With the technical means adopted by the present invention, it is possible to obtain a surface modification that forms a fluorocarbon bond on the surface of lithium titanate, which can be used as an anode material for a lithium electronic secondary batteries, and the use of this anode material for a lithium electronic secondary batteries can avoid the formation of a solid electrolyte layer on the electrode surface while obtaining good electrical conductivity and avoiding the problem of gas generation.

DETAILED DESCRIPTION OF THE PREFERRED EMBODIMENTS

Figure 1:
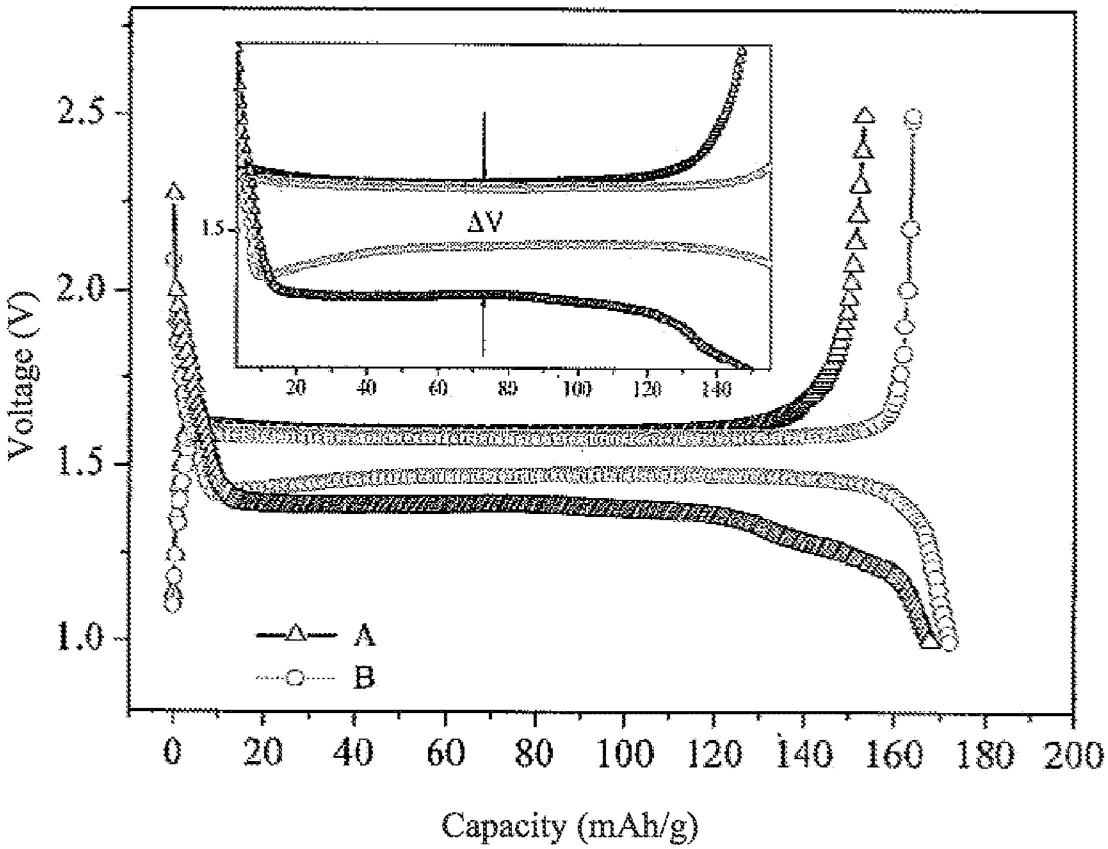
FIG. 1 is a curve graph showing the result of charge and discharge test of a lithium-ion secondary battery according to an embodiment of the present invention.

The preferred embodiments of the present invention are described in detail below referring to FIG. 1-5. The description is used for explaining the embodiments of the present invention only, but not for limiting the scope of the claims.

An anode material for a lithium ion secondary battery according to an embodiment of the present invention comprises a lithium titanate material; and a modified layer coated on the lithium titanate material, wherein the modified layer is a fluorocarbon.

The present invention forms a modified layer containing fluorocarbon bonds on the surface of lithium titanate, which, when heated, results in the reaction of the following chemical formula 1, in which the molecules in the modified layer containing fluorocarbon bonds decompose to form carbon-carbon double bonds and carbon-fluorine bonds, wherein the carbon-fluorine bonds have a greater fluorine electronegativity, which will cause some of the carbon-fluorine bonds to be negatively charged.

[Formula 1]

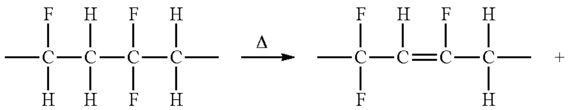

The carbon-fluorine bond in the above formula is beneficial to enhance the ionic conductivity, and by coating the surface of lithium titanate, it can inhibit the by-reaction between the surface of lithium titanate and electrolytes at high temperature and produce gas.

The anode according to an embodiment of the present invention is formed by coating an aluminum foil with a mixture of the anode material for the lithium ion secondary battery, a conductive carbon and an adhesive agent.

The anode according to an embodiment of the present invention comprises 90% by weight of the anode material of the lithium ion secondary battery, 5% by weight of the conductive carbon, and 5% by weight of the adhesive agent.

The lithium ion secondary battery according to an embodiment of the present invention comprises the anode described above.

The lithium ion secondary battery according to an embodiment of the present invention is a lithium-ion button battery.

In the lithium ion secondary battery according to an embodiment of the present invention, the cathode material of the lithium ion secondary battery is lithium cobaltate, lithium nickelate, lithium manganate, ternary cathode materials, lithium iron phosphate, lithium iron manganese phosphate and composite cathode materials composed of ternary cathode materials and lithium iron manganese phosphate.

The manufacturing method of the anode material for the lithium ion secondary battery according to an embodiment of the present invention comprises mixing lithium titanate powder and polyvinylidene fluoride powder to obtain mixed powder; and sintering the mixed powder to obtain, as the anode material for the lithium ion secondary battery, a lithium titanate material on which a modified layer of fluorocarbon is coated.

In the manufacturing method of the anode material for the lithium ion secondary battery according to an embodiment of the present invention, the mixed powder is obtained by mixing 99% by weight of the lithium titanate powder, and 1% by weight of the polyvinylidene fluoride powder.

In the manufacturing method of the anode material for the lithium ion secondary battery according to an embodiment of the present invention, the mixed powder is sintered at 300° C. for 2 hours under air to obtain the anode material for the lithium ion secondary battery.

In this example, the ratio of the negative electrode material: polyvinylidene difluoride (PVDF) as the adhesive: Super P as the conductive carbon is 90:5:5 by weight, and the appropriate amount of N-Methylpyrrolidone (NMP) solvent is added.) solvent, mix and stir for 8 hours to form a homogeneous thick paste. Then the mixed paste is coated on the aluminum foil for battery and dried in the oven, and then the dried negative electrode is cut into 9.5 mm round electrode pieces and finally vacuum dried at 110° C. for 12 hours and sent to the glove box for use.

In the glove box, lithium metal is used as a counter electrode, and a button-type half-cell is assembled with lithium metal, an isolation film, an electrolyte with additives, and an electrode sheet made as in the above example, and the half-cell is subjected to the electrical test as described later.

The electrolyte solution contains an electrolyte and a non-aqueous solvent, wherein lithium hexafluorophosphate ($LiPF_6$) is used as the electrolyte and ethylene carbonates (EC) and dimethyl carbonate (DMC) are used as the non-aqueous solution, and 1.2M of $LiPF_6$ is dissolved in the mixture of EC and DMC, wherein the ratio of EC to DMC is EC/DMC=3/7

The assembled button cell was used as group B of the experimental group, and the button cell with untreated lithium titanate electrodes was used as group A of the control group.

Firstly, the first charge/discharge and polarization phenomenon test was performed with 1 C discharge rate. The curve graph of the results is shown in FIG. 1, and the values of the experimental results are shown in Table 1.

TABLE 1

| Test | $1^{st}$ discharge capacity(mAh/g) | $1^{st}$ Coulombic efficiency (%) | ΔV (V) |
|---|---|---|---|
| Group A | 166.98 | 89.57 | 0.198 |
| Group B | 172.08 | 95.59 | 0.101 |

As shown in the curve graph of results in FIG. 1 and Table 1, the measured first discharge capacity of Group B is significantly higher at 172.08 mAh/g than that of Group A at 166.98 mAh/g. On the other hand, the voltage difference (ΔV) between the two platforms of each group in the graph is an indication of the degree of polarization in the cell, and as shown in Table 1, the polarization phenomenon of group B is significantly smaller than that of group A.

From the above results, it can be seen that the surface fluorinated lithium titanate can effectively increase the electric capacity, and the polarization phenomenon is significantly reduced due to the influence of the outer ion-conducting layer.

Then the cycle life test of the button-type battery was performed by charging and discharging at 1 C for 100 cycles. The curves of the results are shown in FIG. 2, and the values of the experimental results are shown in Table 2.

TABLE 2

| Test | Initial capacity (mAh/g) | Initial Coulombic efficiency (%) | Final capacity (mAh/g) | Capacity Retention (%) |
|---|---|---|---|---|
| Group A | 166.98 | 89.57 | 129.83 | 84.04 |
| Group B | 172.08 | 95.59 | 152.99 | 93.07 |

Figure 2:
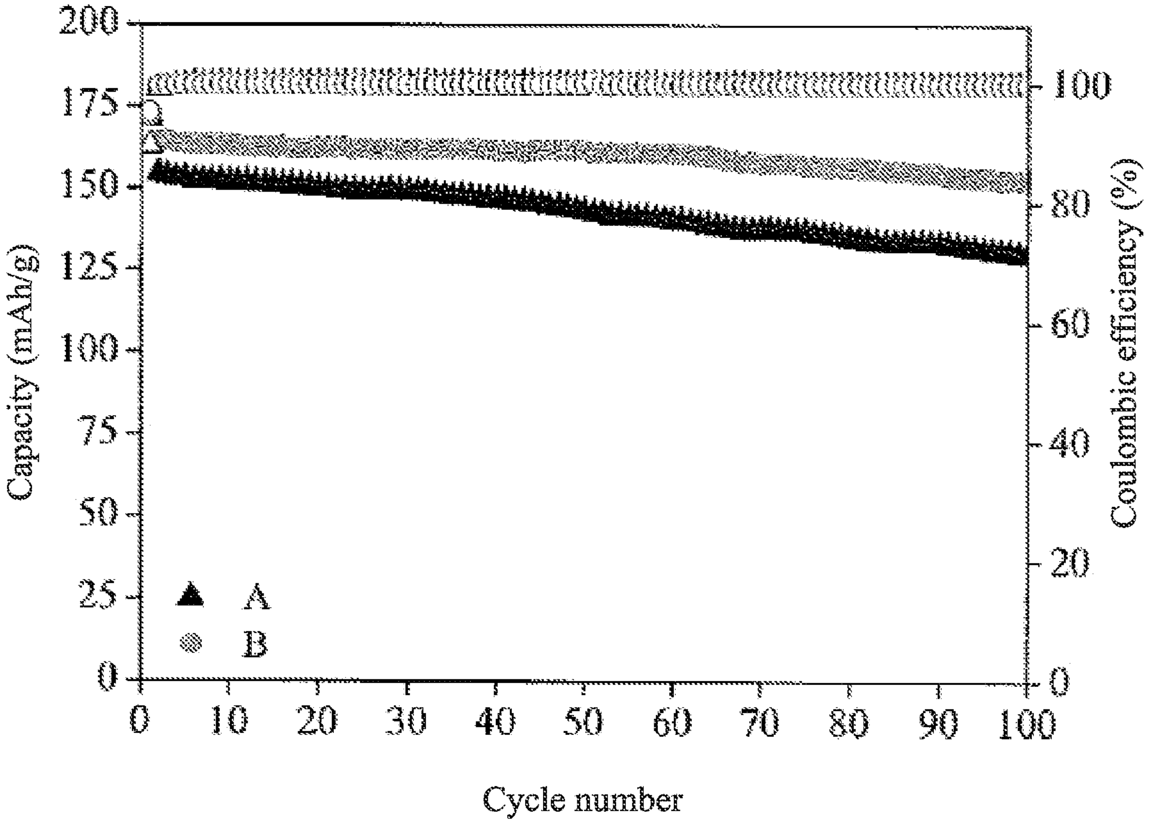
FIG. 2 is a curve graph showing the result of the cycle life test of a lithium-ion secondary battery according to an embodiment of the present invention.

As shown in FIG. 2 and Table 2, after 100 cycles of 1 C charging and discharging, the starting capacity and final capacity of group B are higher than those of group A, and the variation of capacity of group B is also smaller than that of group A.

It can be seen that the surface fluorinated lithium titanate battery has a higher capacity and cycle stability than the lithium titanate battery without surface treatment.

Next, the button battery rate performance test was performed at 0.2 C, 0.5 C, 1 C, 2 C, 5 C and 10 C for charging and discharging. Each rate was tested for 10 cycles, and the results are shown in FIG. 3.

Figure 3:
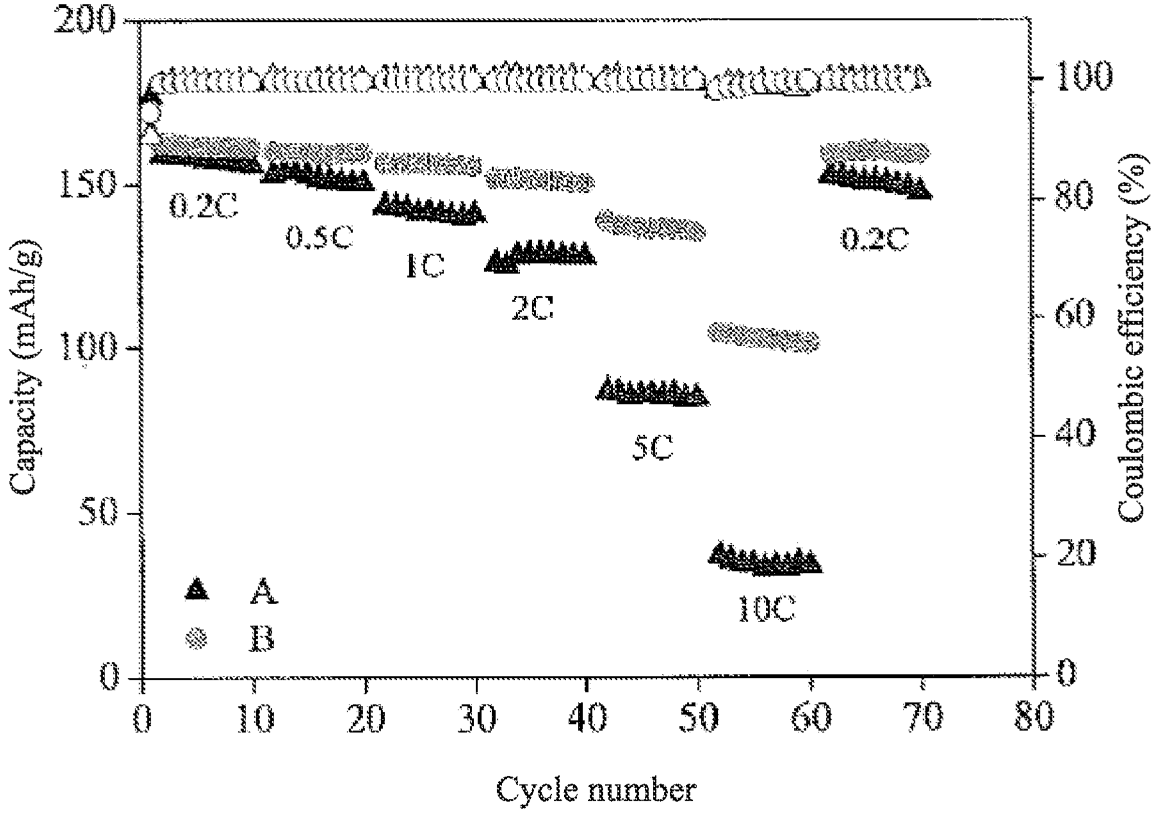
FIG. 3 is a curve graph showing the result of the multiplier performance test of a lithium-ion secondary battery according to an embodiment of the present invention.

As shown in FIG. 3, the capacity of group B (102.57 mAh/g) was able to maintain an initial capacity greater than 60% (0.2 C, 162.01 mAh/g) even at a high rate of 10 C.

It can be seen that the surface fluorinated lithium titanate battery is more favorable to the ion migration under high rate discharge than the lithium titanate battery without surface treatment.

Next, the high-temperature multiplier performance of the button battery was performed by charging and discharging at 65° C. for 1 C and 3 C respectively, and 100 cycles were performed for each multiplier. The curve of the result of 100 cycles at 3 C is shown in FIG. 4, and the curve graph of the result of 100 cycles at 1 C is shown in FIG. 5.

Figure 4:
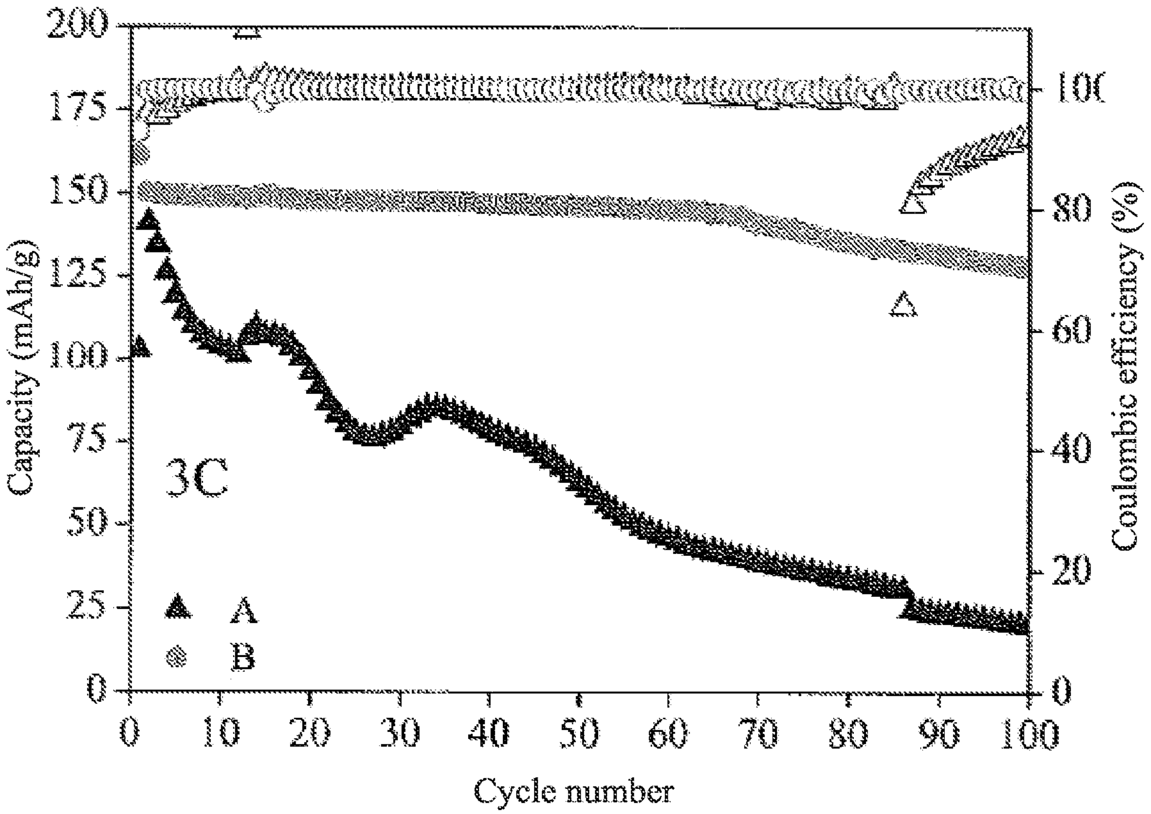
FIG. 4 is a curve graph showing the result of high temperature multiplication performance test for a lithium ion secondary battery according to an embodiment of the present invention.
Figure 5:
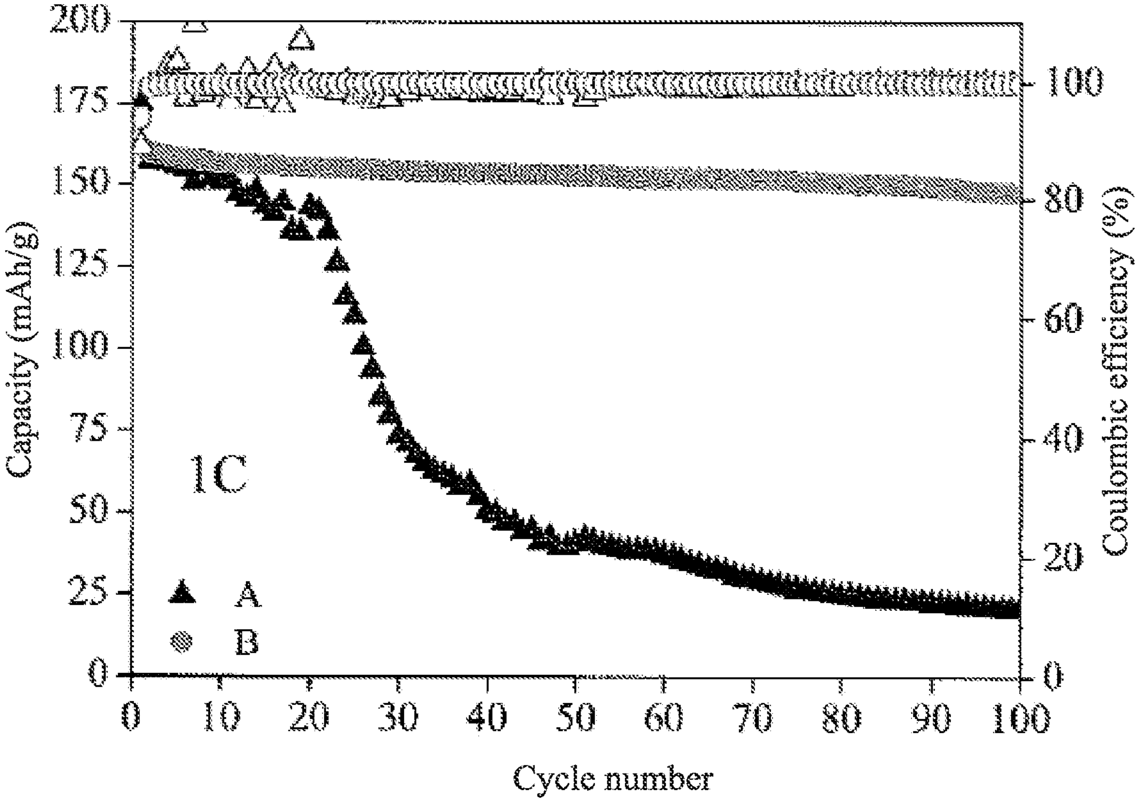
FIG. 5 is a curve graph showing the result of the high temperature multiplication performance test of a lithium-ion secondary battery according to an embodiment of the present invention.

As shown in FIG. 4 and FIG. 5, the capacitance of Group A decreased significantly after discharging at 1 C and 3 C under high temperature environment, while the capacitance retention rate of Group B was 92.15% at current multiplier 1 C and 85.22% at current multiplier 3 C under high temperature environment, which is a significant improvement compared with Group A.

It can be seen that the surface fluorinated lithium titanate battery can protect the surface of the lithium titanate material and inhibit the side reaction with electrolyte even in the high temperature environment where the electrolyte reacts with the electrode surface compared to the non-surface treated lithium titanate battery.

Further, the surface-modified lithium titanate powder was subjected to scanning transmission electron microscope (STEM) energy dispersive spectrometer mapping (EDS-mapping) analysis.

From the analysis results, the signals of carbon and fluorine elements were obtained from the surface of lithium titanate. It is clear that the surface of the lithium titanate material is fluorinated with carbon.

With the technical means adopted by the present invention, the method of manufacturing the anode material of the lithium ion secondary battery of the present invention can obtain the anode material of the lithium ion secondary battery with a surface modification of C—F bonding on the surface of the lithium titanate material. The lithium-ion secondary batteries made with the anode material can obtain good electrical conductivity and avoid gas generation while avoiding the formation of a solid electrolyte layer on the electrode surface.

The above description should be considered as only the discussion of the preferred embodiments of the present invention. However, a person having ordinary skill in the art may make various modifications without deviating from the present invention. Those modifications still fall within the scope of the present invention.

What is claimed is:

1. A manufacturing method of an anode material, comprising:

mixing lithium titanate powder and polyvinylidene fluoride powder to obtain mixed powder; and sintering the mixed powder to obtain, as the anode material, a lithium titanate material on which a modified layer of fluorocarbon is coated, wherein the mixed powder is sintered at 300° C. for 2 hours under air to obtain the anode material.

* * * * *